(12) United States Patent
Togino et al.

(10) Patent No.: US 6,222,688 B1
(45) Date of Patent: Apr. 24, 2001

(54) DECENTERED OPTICAL SYSTEM

(75) Inventors: Takayoshi Togino, Koganei; Tetsuo Nagata, Hachioji, both of (JP)

(73) Assignee: Olympus Optical Co. Ltd., Tokyo (JP)

( * ) Notice: Subject to any disclaimer, the term of this patent is extended or adjusted under 35 U.S.C. 154(b) by 0 days.

(21) Appl. No.: 09/540,537

(22) Filed: Mar. 31, 2000

(30) Foreign Application Priority Data

Sep. 17, 1999 (JP) .................................................. 11-263811

(51) Int. Cl.[7] ...................................................... G02B 5/04
(52) U.S. Cl. ............................................. 359/834; 359/431
(58) Field of Search ................................... 359/831, 832, 359/833, 834, 857, 861, 431

(56) References Cited

U.S. PATENT DOCUMENTS 5,993,016 * 11/1999 Mast ...................................... 359/861
6,002,517 * 12/1999 Elkind ................................... 359/409

FOREIGN PATENT DOCUMENTS 10-186237    7/1998 (JP) .

* cited by examiner

Primary Examiner—Cassandra Spyrou
Assistant Examiner—Mark A. Robinson
(74) Attorney, Agent, or Firm—Pillsbury Winthrop LLP

(57) ABSTRACT

A fast and compact decentered optical system corrected for aberrations due to three-dimensional decentration by three-dimensionally disposing a rotationally asymmetric surface having no plane of symmetry. The decentered optical system includes at least one optical surface with a rotationally asymmetric surface configuration having no plane of symmetry and having a positive power. The decentered optical system has an entrance surface, at least three reflecting surfaces, and an exit surface. At least one of intersections between an optical axis and the entrance surface, the reflecting surfaces and the exit surface is not in a plane where the other intersections are present.

10 Claims, 15 Drawing Sheets

DECENTERED OPTICAL SYSTEM

BACKGROUND OF THE INVENTION

The present invention relates to decentered optical systems and, more particularly, to a compact decentered optical system in which at least three reflecting surfaces having an image-forming power required for image formation are decentered.

Hitherto, an optical system in which a rotationally asymmetric curved surface having no plane of symmetry, e.g. a free-form surface, is three-dimensionally decentered has been proposed by the present applicant in Japanese Patent Application Unexamined Publication (KOKAI) No. 10-186237.

In the conventional three-dimensionally decentered optical system as disclosed in Japanese Patent Application Unexamined Publication (KOKAI) No. 10-186237, when a reflecting surface is formed by using a back coating mirror, the center points in the effective areas of the entrance, reflecting and exit surfaces of a prism or some points thereof are in one plane. Therefore, it is impossible to freely lay out large reflecting and transmitting surfaces owing to the interference between the effective apertures of the surfaces.

SUMMARY OF THE INVENTION

In view of the above-described problems associated with the prior art, an object of the present invention is to provide a fast and compact decentered optical system corrected for aberrations due to three-dimensional decentration by three-dimensionally disposing a rotationally asymmetric surface having no plane of symmetry.

To attain the above-described object, the present invention provides a decentered optical system including at least one optical surface that is a rotationally asymmetric curved surface having no plane of symmetry and having a positive power. The decentered optical system has an entrance surface, at least three reflecting surfaces, and an exit surface. At least one of intersections between an optical axis and the entrance surface, the reflecting surfaces and the exit surface is not in a plane where the other intersections are present.

In this case, it is desirable that the space lying between the entrance surface, the at least three reflecting surfaces and the exit surface should be filled with a medium having a refractive index larger than 1.

The function of the present invention will be described below.

According to the present invention, a rotationally asymmetric surface is formed from a curved surface having no plane of symmetry. Therefore, it is possible to correct rotationally asymmetric aberrations having no plane of symmetry that are produced by a three-dimensionally decentered optical system. Thus, it is possible to provide a decentered prism optical system or the like which is compact and has minimal aberrations and which is suitable for use as an image-forming optical system of an electronic camera or as an ocular optical system used in a head-mounted image observation apparatus.

The arrangement and operation of the present invention will be described below more specifically.

The basic decentered optical system according to the present invention is characterized by including at least one optical surface that is a rotationally asymmetric curved surface having no plane of symmetry and having a positive power.

In a case where the decentered optical system is used, for example, as an ocular optical system of a head-mounted image display apparatus, or as an image-forming optical system of a camera, an endoscope, etc., it is necessary in order to eliminate a dead space and minimize the overall size of the apparatus to dispose an image display device or an image-formation plane and each optical surface constituting the decentered optical system such that the constituent elements are accommodated in the apparatus in as compact a form as possible. Consequently, the optical system must inevitably be decentered three-dimensionally, and this causes rotationally asymmetric aberrations to occur. It is impossible to correct the rotationally asymmetric aberrations by only a rotationally symmetric optical system. The best surface configuration for correcting the rotationally asymmetric aberrations due to three-dimensional decentration is a rotationally asymmetric surface. Therefore, in the decentered optical system according to the present invention, a rotationally asymmetric surface having no plane of symmetry and having a positive power is disposed in the optical system to effect image formation and to correct the rotationally asymmetric aberrations.

A free-form surface used in the present invention as a rotationally asymmetric surface having no plane of symmetry is defined by the following equation. The Z-axis of the defining equation is the axis of the free-form surface.

$$Z = cr^2 / \left[1 + \sqrt{\{1 - (1+k)c^2 r^2\}}\right] + \sum_{j=2}^{66} C_j X^m Y^n \quad (a)$$

In Eq. (a), the first term is a spherical surface term, and the second term is a free-form surface term.

In the spherical surface term:

c: the curvature at the vertex k: a conic constant $r=\sqrt{(X^2+Y^2)}$

The free-form surface term is given by $$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero. Therefore, at least one of free-form surfaces used in the present invention is a free-form surface in which at least one of the terms of odd-numbered degrees with respect to X is not zero and at least one of the terms of odd-numbered degrees with respect to Y is not zero.

The above-described free-form surface as a rotationally asymmetric surface having no plane of symmetry may also be defined by Zernike polynomials. That is, the configuration of the free-form surface may be defined by the following equation (b). The Z-axis of the defining equation (b) is the axis of Zernike polynomial.

$$x = R \times \cos(A) \quad \text{(b)}$$
$$y = R \times \sin(A)$$
$$z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A)\ldots$$

where $D_m$ (m is an integer of 2 or higher) are coefficients.

The above defining equations are shown as merely examples of equations defining a rotationally asymmetric surface having no plane of symmetry, and the same advantageous effect can be obtained for any other defining equation that expresses such a rotationally asymmetric surface.

The decentered optical system according to the present invention has at least three reflecting surfaces. If there are three or more reflecting surfaces between the entrance surface and the exit surface, when the optical system is arranged so that the optical axis entering through the entrance surface and the optical axis exiting from the exit surface are approximately parallel to each other and travel in the same direction, the degree of freedom with which the reflecting surfaces can be disposed between the entrance and exit surfaces increases. In addition, because the optical path can be routed effectively, the effective areas of the entrance and exit surfaces can be widened. Moreover, it is possible to reduce the volumetric capacity of the decentered optical system and to construct a fast and compact decentered optical system.

It is desirable that the space lying between the entrance surface, the at least three reflecting surfaces and the exit surface should be filled with a medium having a refractive index larger than 1.

The reflecting surfaces are preferably reflecting surfaces having a thin film of a metal, e.g. aluminum or silver, formed thereon, or reflecting surfaces having a dielectric multilayer film formed thereon. In the case of a metal thin film having reflecting action, a high reflectivity can be readily obtained. The use of a dielectric reflecting film is advantageous in a case where a reflecting film having wavelength selectivity, semitransparent surface or minimal absorption is to be formed.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Numerical Examples 1 to 4 of the decentered optical system according to the present invention will be described below. It should be noted that constituent parameters of each example will be shown later.

The arrangement of each surface and optical paths in Examples 1 to 4 are schematically shown in FIGS. 1 to 4. In these figures, the entrance surface, reflecting surfaces and exit surface constituting each optical system are represented by plane surfaces for the simplification of illustration. Regarding the effective areas of the surfaces, only regions near the optical axis are shown. As to the term "optical axis", a light ray emanating from the object center and passing through the center of the stop to reach the center of the image-formation plane is defined as an optical axis.

Each decentered surface is given displacements in the X-, Y- and Z-axis directions (X, Y and Z, respectively) of the vertex position of the surface from the center of a reference plane [denoted by (RP) in the tables of constituent parameters (shown later)], and tilt angles (degrees) of the center axis of the surface [the Z-axis of the above equation (a) in regard to free-form surfaces] with respect to the X-, Y- and Z-axes ($\alpha$, $\beta$ and $\gamma$, respectively). In this case, the direction of rays passing through the center of the reference plane (optical axis direction) is defined as a positive direction of the Z-axis. In addition, the positive of the tilt angles $\alpha$ and $\beta$ means counterclockwise rotation relative to the positive directions of the corresponding axes, and the positive of the tilt angle $\gamma$ means clockwise rotation relative to the positive direction of the Z-axis.

Figure 14:
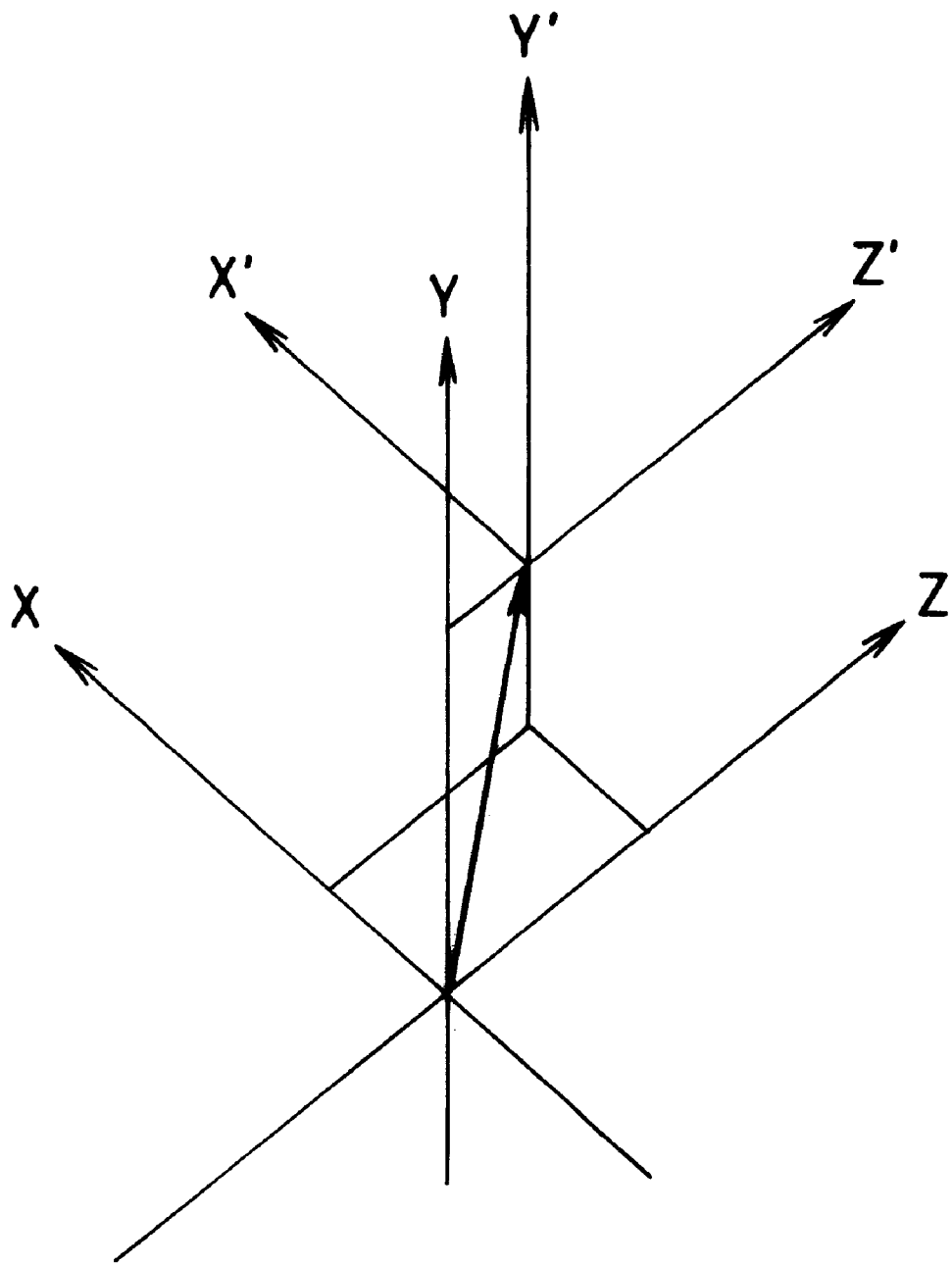
FIG. 14 is a diagram for describing the way of determining an amount of displacement.

The way of determining the displacements X, Y and Z and the tilt angles $\alpha$, $\beta$ and $\gamma$ is as follows: As shown in FIG. 14, the X, Y and Z of the coordinate system are translated first. In the figure, the coordinate system before the parallel translation is denoted by (X, Y, Z), and the coordinate system after the parallel translation is denoted by (X', Y', Z'). The same shall apply hereinafter.

Figure 15:
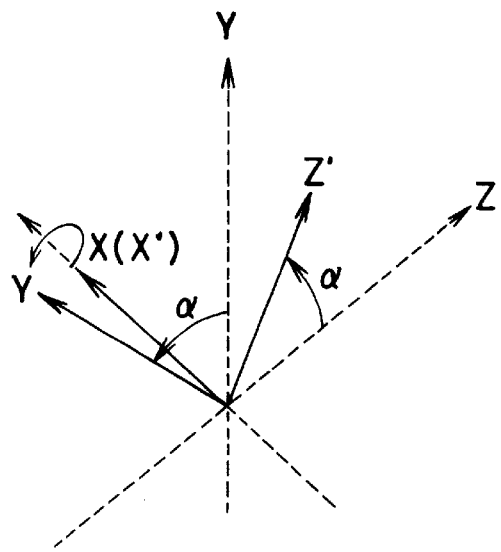
FIG. 15 is a diagram for describing the way of determining a tilt angle.
Figure 15:
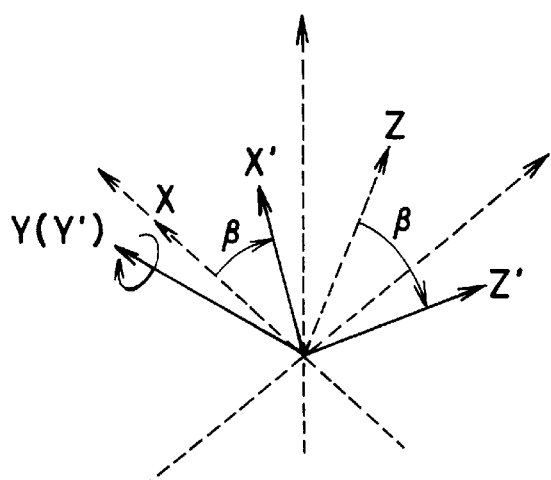
Figure 15:
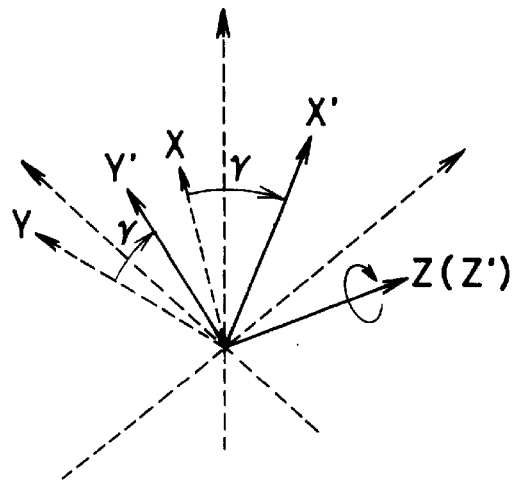

Next, the rotation of the new coordinate system through $\alpha$, $\beta$ and $\gamma$ is effected in order. First, as shown in part (a) of FIG. 15, the Y-axis and the Z-axis are rotated through $\alpha$ about the X-axis. Thereafter, the X-axis and the Z-axis are rotated through $\beta$ about the Y-axis of the coordinate system rotated in part (a) of FIG. 15. Finally, the X-axis and the Y-axis are rotated through $\gamma$ about the Z-axis of the coordinate system rotated in part (b) of FIG. 15. The Z'-axis of the coordinate system (X', Y', Z') after the rotation is the Z-axis of the equation defining the surface concerned. The Y'-axis is the Y-axis, and the Z'-axis is the Z-axis.

Among the optical surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in each example is defined by the above equation (a). The Z-axis of the defining equation is the axis of the free-form surface.

In the constituent parameters (shown later), those terms concerning aspherical surfaces for which no data is shown are zero. The refractive index is expressed by the refractive index for the spectral d-line (wavelength: 587.56 nanometers). Lengths are given in millimeters.

The following Examples 1 to 3 have a focal length of 5 millimeters, a horizontal field angle of 52.62° and a vertical field angle of 40.68°, which are equivalent to a lens having a focal length of 35 millimeters in terms of the focal length of a 35-mm camera. The entrance pupil diameter is 1.1558 millimeters, and F-number is 4.3. The image height is 2.451×1.838 millimeters. Example 4 has a focal length of 6 millimeters, a horizontal field angle of 50.22° and a vertical field angle of 38.30°, which is equivalent to a lens having a focal length of 37 millimeters in terms of the focal length of a 35-mm camera. The entrance pupil diameter is 2.143 millimeters, and F-number is 2.8. The image height is 2.812×2.083 millimeters. Examples 3 and 4 are optical systems in which an intermediate image is formed in the optical path.

Figure 1:
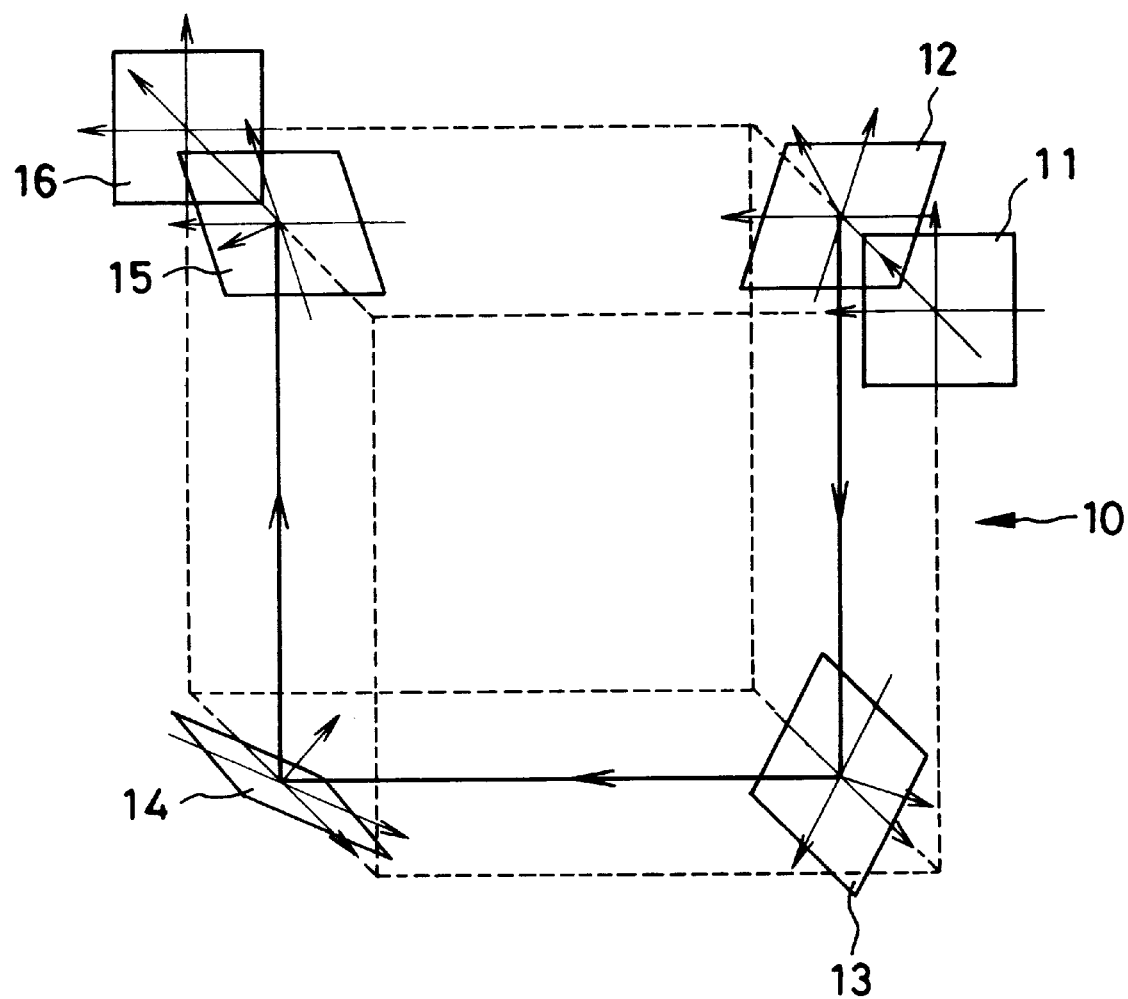
FIG. 1 is a diagram schematically showing the arrangement of each surface of a decentered optical system according to Example 1 of the present invention, together with an optical path.

FIG. 1 is a diagram showing the surface arrangement and the optical axis in Example 1. The decentered prism optical system comprises 6 curved surfaces 11 to 16. The first surface 11 is an entrance surface, which is a refracting surface through which rays enter the decentered prism. The second to fifth surfaces 12 to 15 are reflecting surfaces formed from back coating mirrors. The sixth surface 16 is an exit surface, which is a refracting surface through which rays exit from the decentered prism.

Rays from an object enter through the first surface 11 and are successively reflected by the second to fifth surfaces 12 to 15. The reflected rays exit from the sixth surface 16 and form an image on an image plane.

Regarding the travel direction of the optical axis, the optical axis entering through the first surface 11 and the optical axis exiting from the sixth surface 16 are parallel to each other and travel in the same direction. The optical axis is reflected successively by the second to fourth surfaces 12 to 14 and incident on the fifth surface 15 in one plane. The optical axis incident on the second surface 12 enters the plane from the obverse side thereof, and the optical axis reflected by the fifth surface 15 emerges from the reverse side of the plane.

Figure 2:
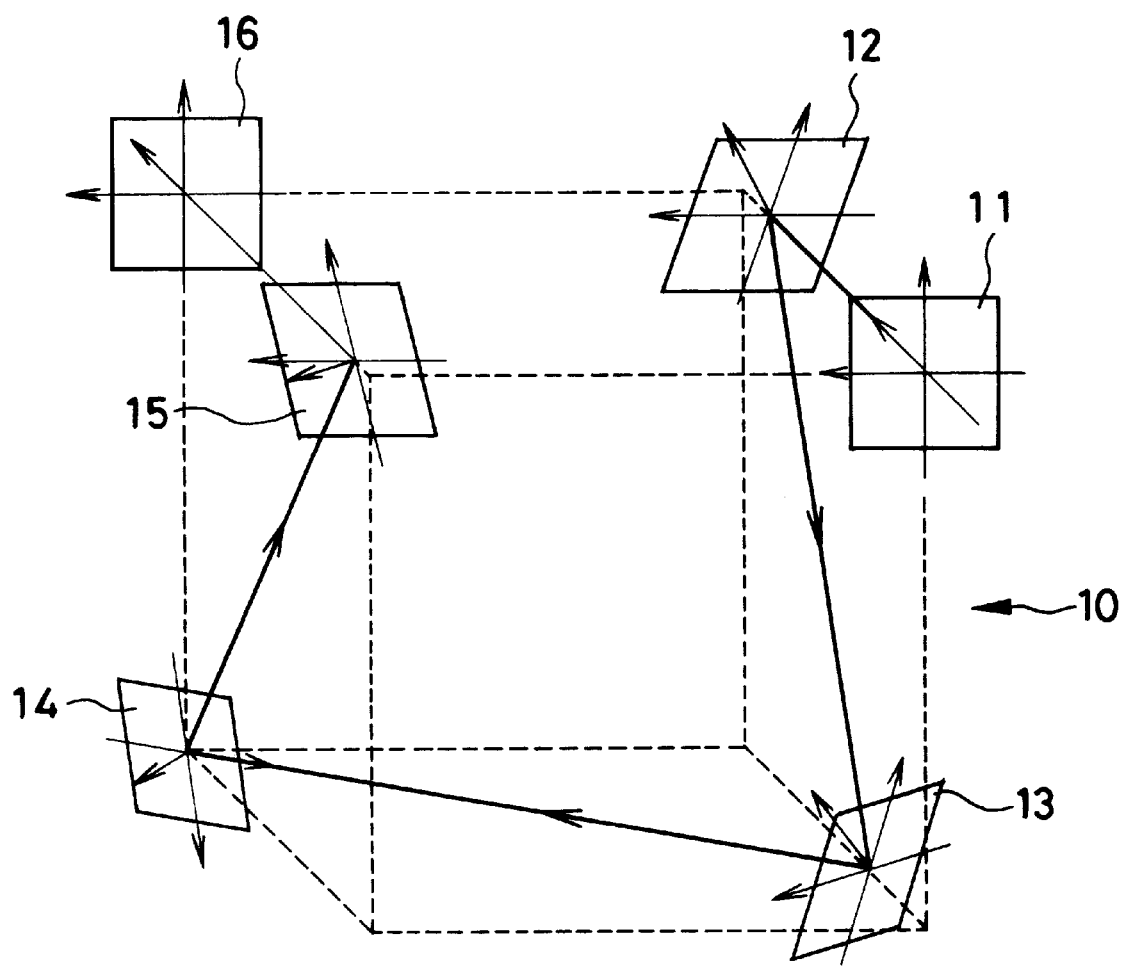
FIG. 2 is a diagram schematically showing the arrangement of each surface of a decentered optical system according to Example 2 of the present invention, together with an optical path.

FIG. 2 is a diagram showing the surface arrangement and the optical axis in Example 2. The decentered prism optical system 10 comprises 6 curved surfaces 11 to 16. The first surface 11 is an entrance surface, which is a refracting surface through which rays enter the decentered prism. The second to fifth surfaces 12 to 15 are reflecting surfaces formed from back coating mirrors. The sixth surface 16 is an exit surface, which is a refracting surface through which rays exit from the decentered prism.

Rays from an object enter through the first surface 11 and are successively reflected by the second to fifth surfaces 12 to 15. The reflected rays exit from the sixth surface 16 and form an image on an image plane.

Regarding the travel direction of the optical axis, the optical axis entering through the first surface 11 and the optical axis exiting from the sixth surface 16 are parallel to each other and travel in the same direction. The optical axis incident on the second surface 12 enters a plane containing the optical axis incident on the third surface 13 and the optical axis reflected by the third surface 13 from the obverse side of the plane, and the optical axis reflected by the fourth surface 14 and incident on the fifth surface 15 emerges from the obverse side of the plane. The optical axis reflected by the fifth surface 15 travels toward the obverse side of the plane. The optical axis from the third surface 13 to the sixth surface 16 is present on one side of a plane containing the optical axis incident on the second surface 12 and the optical axis reflected by the second surface 12.

Figure 3:
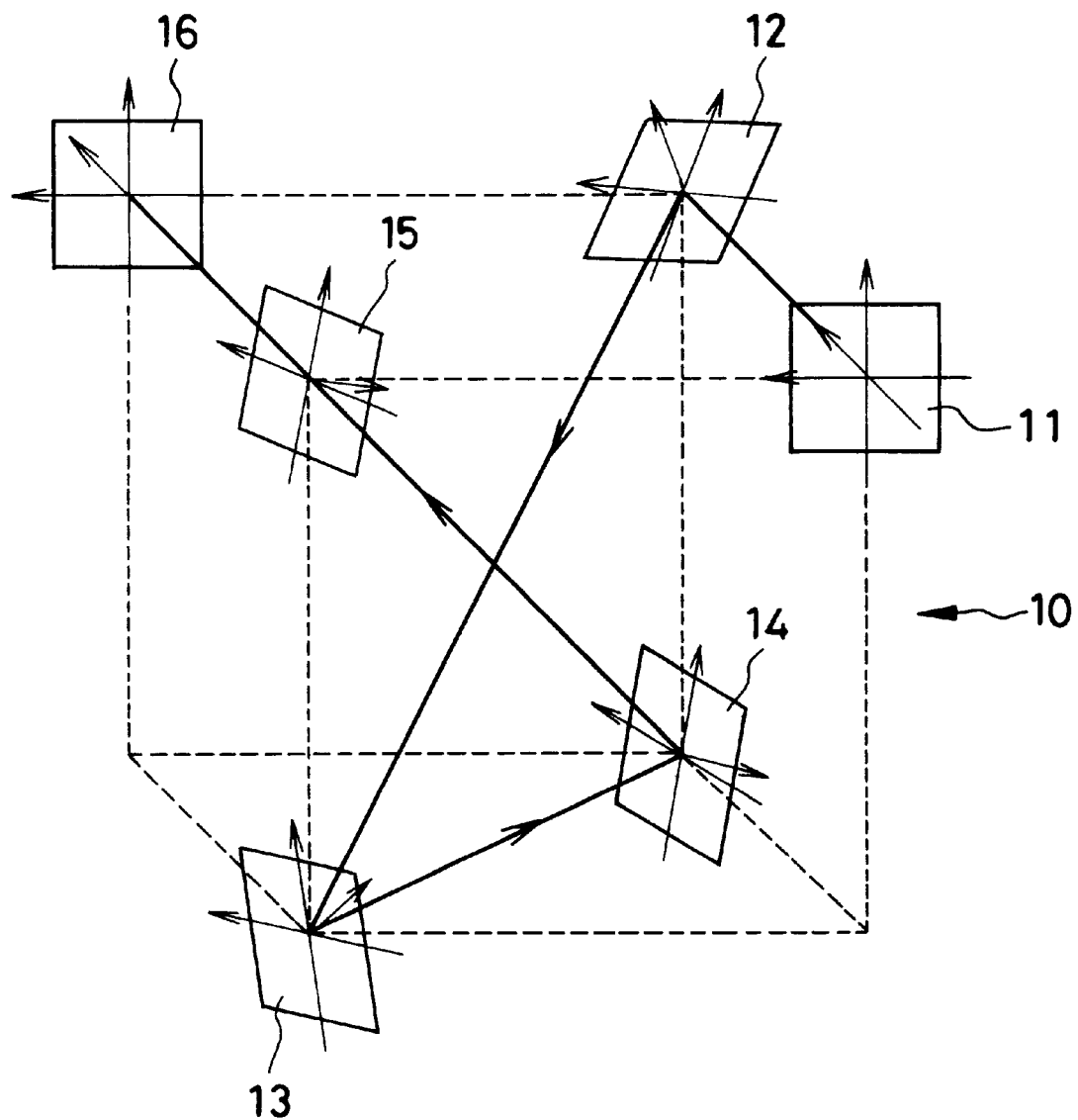
FIG. 3 is a diagram schematically showing the arrangement of each surface of a decentered optical system according to Example 3 of the present invention, together with an optical path.

FIG. 3 is a diagram showing the surface arrangement and the optical axis in Example 3. The decentered prism optical system 10 comprises 6 curved surfaces 11 to 16. The first surface 11 is an entrance surface, which is a refracting surface through which rays enter the decentered prism. The second to fifth surfaces 12 to 15 are reflecting surfaces formed from back coating mirrors. The sixth surface 16 is an exit surface, which is a refracting surface through which rays exit from the decentered prism.

Rays from an object enter through the first surface 11 and are successively reflected by the second to fifth surfaces 12 to 15. The reflected rays exit from the sixth surface 16 and form an image on an image plane.

Regarding the travel direction of the optical axis, the optical axis entering through the first surface 11 and the optical axis exiting from the sixth surface 16 are parallel to each other and travel in the same direction. The optical axis incident on the second surface 12 enters a plane containing the optical axis incident on the third surface 13 and the optical axis reflected by the third surface 13 from the obverse side of the plane. The optical axis reflected by the fourth surface 14 and incident on the fifth surface 15 travels in the plane and intersects the optical axis incident on the third surface 13. The optical axis reflected by the fifth surface 15 emerges from the reverse side of the plane. The optical axis incident on the fourth surface 14 lies on one side of a plane containing the optical axis incident on the second surface 12 and the optical axis reflected by the second surface 12, and the optical axis reflected by the fourth surface 14 intersects the plane to emerge from the other side thereof and is incident on the fifth surface 15.

Figure 4:
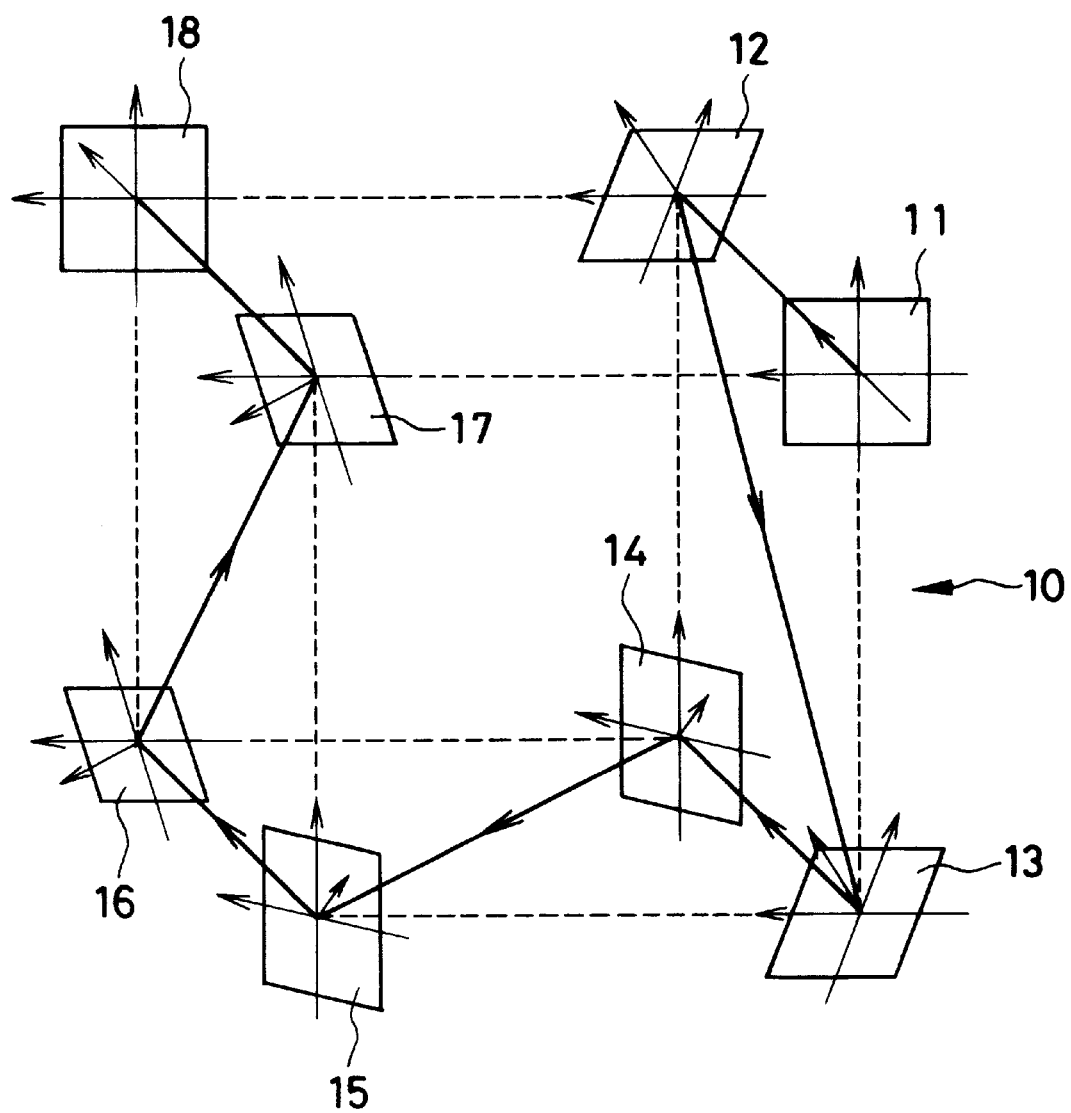
FIG. 4 is a diagram schematically showing the arrangement of each surface of a decentered optical system according to Example 4 of the present invention, together with an optical path.

FIG. 4 is a diagram showing the surface arrangement and the optical axis in Example 4. The decentered prism optical system 10 comprises 8 curved surfaces 11 to 18. The first surface 11 is an entrance surface, which is a refracting surface through which rays enter the decentered prism. The second to seventh surfaces 12 to 17 are reflecting surfaces formed from back coating mirrors. The eighth surface 18 is an exit surface, which is a refracting surface through which rays exit from the decentered prism.

Rays from an object enter through the first surface 11 and are successively reflected by the second to seventh surfaces 12 to 17. The reflected rays exit from the eighth surface 18 and form an image on an image plane.

Regarding the travel direction of the optical axis, the optical axis entering through the first surface 11 and the optical axis exiting from the eighth surface 18 are parallel to each other and travel in the same direction. A plane surrounded by the optical axis incident on the third surface 13 and the optical axis reflected by the third surface 13 and a plane surrounded by the optical axis incident on the sixth surface 16 and the optical axis reflected by the sixth surface 16 do not intersect each other.

Constituent parameters of the above-described Examples 1 to 4 will be shown below. In the tables below: "FFS" denotes a free-form surface; "RS" denotes a reflecting surface; and "RP" denotes a reference plane.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | FFS① (RP1) | | | 1.5254 | 55.8 |
| 2 | FFS② (RS) | | (1) | 1.5254 | 55.8 |
| 3 | FFS③ (Stop) (RS) | | (2) | 1.5254 | 55.8 |
| 4 | FFS④ (RS) | | (3) | 1.5254 | 55.8 |
| 5 | FFS⑤ (RS) | | (4) | 1.5254 | 55.8 |
| 6 | FFS⑥ | | (5) | | |
| 7 | ∞ (RP2) | 1.00 | (5) | | |
| Image plane | ∞ | | | | |

| | FFS① | | | | |
|---|---|---|---|---|---|
| $C_4$ | $3.1749 \times 10^{-3}$ | $C_6$ | $2.0171 \times 10^{-2}$ | | |
| | FFS② | | | | |
| $C_4$ | $5.1464 \times 10^{-3}$ | $C_5$ | $-1.5386 \times 10^{-3}$ | $C_6$ | $4.7117 \times 10^{-3}$ |
| $C_7$ | $-1.4403 \times 10^{-3}$ | $C_8$ | $4.1950 \times 10^{-4}$ | $C_9$ | $-4.9966 \times 10^{-4}$ |
| $C_{10}$ | $-5.1735 \times 10^{-4}$ | | | | |
| | FFS③ | | | | |
| $C_4$ | $-6.0434 \times 10^{-4}$ | $C_5$ | $3.9485 \times 10^{-4}$ | $C_6$ | $6.2732 \times 10^{-3}$ |
| $C_7$ | $-1.5605 \times 10^{-3}$ | $C_8$ | $8.1613 \times 10^{-4}$ | $C_9$ | $-1.7475 \times 10^{-3}$ |
| $C_{10}$ | $-1.9456 \times 10^{-3}$ | | | | |
| | FFS④ | | | | |
| $C_4$ | $-1.9748 \times 10^{-2}$ | $C_5$ | $6.0908 \times 10^{-3}$ | $C_6$ | $-1.3620 \times 10^{-2}$ |
| $C_7$ | $-6.4377 \times 10^{-4}$ | $C_8$ | $2.7612 \times 10^{-4}$ | $C_9$ | $-1.6499 \times 10^{-3}$ |
| $C_{10}$ | $1.5901 \times 10^{-3}$ | | | | |
| | FFS⑤ | | | | |
| $C_4$ | $-6.1278 \times 10^{-3}$ | $C_5$ | $9.0012 \times 10^{-3}$ | $C_6$ | $2.2363 \times 10^{-2}$ |
| $C_7$ | $2.2421 \times 10^{-4}$ | $C_8$ | $-5.1738 \times 10^{-4}$ | $C_9$ | $1.0763 \times 10^{-3}$ |
| $C_{10}$ | $3.1545 \times 10^{-4}$ | | | | |
| | FFS⑥ | | | | |
| $C_4$ | $-1.0867 \times 10^{-1}$ | $C_6$ | $1.1900 \times 10^{-1}$ | | |

| Displacement and tilt(1) | | | | | |
|---|---|---|---|---|---|
| X | 0.00 | Y | 0.00 | Z | 2.00 |
| α | 45.00 | β | 0.00 | γ | 0.00 |
| Displacement and tilt(2) | | | | | |
| X | 0.00 | Y | −5.00 | Z | 2.00 |
| α | 90.00 | β | −45.00 | γ | 0.00 |
| Displacement and tilt(3) | | | | | |
| X | 5.00 | Y | −5.00 | Z | 2.00 |
| α | 90.00 | β | 225.00 | γ | 0.00 |
| Displacement and tilt(4) | | | | | |
| X | 5.00 | Y | 0.00 | Z | 2.00 |
| α | −45.00 | β | 0.00 | γ | 0.00 |
| Displacement and tilt(5) | | | | | |
| X | 5.00 | Y | 0.00 | Z | 6.00 |
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | FFS① (RP1) | | | 1.5254 | 55.8 |
| 2 | FFS② (RS) | | (1) | 1.5254 | 55.8 |
| 3 | FFS③ (RS) | | (2) | 1.5254 | 55.8 |
| 4 | ∞ (Stop) | | (3) | 1.5254 | 55.8 |
| 5 | FFS④ (RS) | | (4) | 1.5254 | 55.8 |
| 6 | FFS⑤ (RS) | | (5) | 1.5254 | 55.8 |
| 7 | FFS⑥ | | (6) | | |
| 8 | ∞ (RP2) | 0.99 | (7) | | |
| Image plane | ∞ | | | | |

| | FFS① | | | | |
|---|---|---|---|---|---|
| $C_4$ | $4.5929 \times 10^{-2}$ | $C_6$ | $3.2340 \times 10^{-2}$ | | |
| | FFS② | | | | |
| $C_4$ | $4.3617 \times 10^{-2}$ | $C_5$ | $1.4401 \times 10^{-2}$ | $C_6$ | $1.5845 \times 10^{-2}$ |
| $C_7$ | $-1.6202 \times 10^{-5}$ | $C_8$ | $-6.9140 \times 10^{-4}$ | $C_9$ | $1.1917 \times 10^{-3}$ |
| $C_{10}$ | $8.2412 \times 10^{-4}$ | | | | |
| | FFS③ | | | | |
| $C_4$ | $2.0784 \times 10^{-2}$ | $C_5$ | $1.5947 \times 10^{-2}$ | $C_6$ | $6.6222 \times 10^{-3}$ |
| $C_7$ | $-9.6845 \times 10^{-5}$ | $C_8$ | $6.2450 \times 10^{-5}$ | $C_9$ | $9.9200 \times 10^{-4}$ |
| $C_{10}$ | $1.1544 \times 10^{-3}$ | | | | |
| | FFS④ | | | | |
| $C_4$ | $-9.1776 \times 10^{-3}$ | $C_5$ | $-1.2572 \times 10^{-2}$ | $C_6$ | $-5.1640 \times 10^{-3}$ |
| $C_7$ | $-1.2099 \times 10^{-3}$ | $C_8$ | $1.1907 \times 10^{-3}$ | $C_9$ | $-7.8282 \times 10^{-4}$ |
| $C_{10}$ | $6.3541 \times 10^{-4}$ | | | | |
| | FFS⑤ | | | | |
| $C_4$ | $2.4246 \times 10^{-2}$ | $C_5$ | $-5.6935 \times 10^{-3}$ | $C_6$ | $1.8503 \times 10^{-2}$ |
| $C_7$ | $3.6614 \times 10^{-4}$ | $C_8$ | $-1.5208 \times 10^{-6}$ | $C_9$ | $-3.3418 \times 10^{-4}$ |
| $C_{10}$ | $1.5761 \times 10^{-4}$ | | | | |
| | FFS⑥ | | | | |
| $C_4$ | $1.1769 \times 10^{-1}$ | $C_6$ | $4.3534 \times 10^{-2}$ | | |

| Displacement and tilt(1) | | | | | |
|---|---|---|---|---|---|
| X | 0.00 | Y | 0.00 | Z | 5.00 |
| α | 31.77 | β | 0.00 | γ | 0.00 |
| Displacement and tilt(2) | | | | | |
| X | 0.00 | Y | −8.04 | Z | 1.00 |
| α | 43.56 | β | −33.75 | γ | 0.00 |
| Displacement and tilt(3) | | | | | |
| X | 3.50 | Y | −8.04 | Z | 3.00 |
| α | 0.00 | β | −60.26 | γ | 0.00 |
| Displacement and tilt(4) | | | | | |
| X | 7.00 | Y | −8.04 | Z | 6.00 |
| α | 137.47 | β | 215.31 | γ | 0.00 |
| Displacement and tilt(5) | | | | | |
| X | 7.00 | Y | 0.00 | Z | 1.00 |
| α | −30.73 | β | 0.00 | γ | 0.00 |
| Displacement and tilt(6) | | | | | |

-continued

| | | | | | |
|---|---|---|---|---|---|
| X | 7.00 | Y | 0.00 | Z | 6.00 |
| α | 0.00 | β | 0.00 | γ | 0.00 |
| Displacement and tilt(7) | | | | | |
| X | 7.00 | Y | 0.00 | Z | 6.00 |
| α | 0.00 | β | 0.00 | γ | 98.48 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) (RP1) | | | | |
| 2 | FFS① | | | 1.5254 | 55.8 |
| 3 | FFS② (RS) | | (1) | 1.5254 | 55.8 |
| 4 | FFS③ (RS) | | (2) | 1.5254 | 55.8 |
| 5 | FFS④ (RS) | | (3) | 1.5254 | 55.8 |
| 6 | FFS⑤ (RS) | | (4) | 1.5254 | 55.8 |
| 7 | FFS⑥ | | (5) | | |
| 8 | ∞ (RP2) | 1.00 | (6) | | |
| Image plane | ∞ | | | | |

FFS①
$C_4$  $-1.8375 \times 10^{-2}$  $C_6$  $1.4033 \times 10^{-1}$

FFS②
$C_4$  $-2.2293 \times 10^{-2}$  $C_5$  $2.1924 \times 10^{-2}$  $C_6$  $-3.9952 \times 10^{-2}$
$C_7$  $2.1019 \times 10^{-3}$  $C_8$  $2.9617 \times 10^{-3}$  $C_9$  $-6.2341 \times 10^{-4}$
$C_{10}$  $2.2199 \times 10^{-3}$  $C_{11}$  $-3.3318 \times 10^{-5}$  $C_{12}$  $2.4098 \times 10^{-4}$
$C_{13}$  $1.0247 \times 10^{-3}$  $C_{14}$  $4.7818 \times 10^{-4}$  $C_{15}$  $2.0648 \times 10^{-3}$ FFS③
$C_4$  $3.4120 \times 10^{-2}$  $C_5$  $-2.2426 \times 10^{-2}$  $C_6$  $1.4133 \times 10^{-2}$
$C_7$  $2.4639 \times 10^{-3}$  $C_8$  $2.5496 \times 10^{-3}$  $C_9$  $-8.7082 \times 10^{-4}$
$C_{10}$  $6.0977 \times 10^{-4}$  $C_{11}$  $-1.9401 \times 10^{-4}$  $C_{12}$  $-3.0875 \times 10^{-4}$
$C_{13}$  $1.1466 \times 10^{-3}$  $C_{14}$  $-3.7110 \times 10^{-4}$  $C_{15}$  $7.8889 \times 10^{-5}$ FFS④
$C_4$  $-5.0907 \times 10^{-2}$  $C_5$  $-1.1834 \times 10^{-2}$  $C_6$  $-4.1592 \times 10^{-2}$
$C_7$  $1.4998 \times 10^{-3}$  $C_8$  $8.6595 \times 10^{-4}$  $C_9$  $7.5338 \times 10^{-4}$
$C_{10}$  $1.2364 \times 10^{-5}$  $C_{11}$  $1.5483 \times 10^{-4}$  $C_{12}$  $1.4783 \times 10^{-5}$
$C_{13}$  $-1.9973 \times 10^{-4}$  $C_{14}$  $-6.9225 \times 10^{-6}$  $C_{15}$  $-7.3612 \times 10^{-5}$ FFS⑤
$C_4$  $3.3646 \times 10^{-2}$  $C_5$  $5.5435 \times 10^{-2}$  $C_6$  $2.4099 \times 10^{-2}$
$C_7$  $1.7713 \times 10^{-3}$  $C_8$  $-4.6530 \times 10^{-3}$  $C_9$  $1.9167 \times 10^{-3}$
$C_{10}$  $-2.5902 \times 10^{-3}$  $C_{11}$  $-2.0645 \times 10^{-5}$  $C_{12}$  $-3.6449 \times 10^{-4}$
$C_{13}$  $4.8859 \times 10^{-4}$  $C_{14}$  $9.6423 \times 10^{-4}$  $C_{15}$  $4.9063 \times 10{-5}$ FFS⑥
$C_4$  $1.3158 \times 10^{-1}$  $C_6$  $-5.3652 \times 10^{-2}$ Displacement and tilt(1)
X  0.00  Y  0.00  Z  4.00
α  20.10  β  18.97  γ  0.00

Displacement and tilt(2)
X  4.00  Y  -4.00  Z  0.00
α  24.20  β  42.37  γ  0.00

Displacement and tilt(3)
X  0.00  Y  -4.00  Z  4.00
α  -24.20  β  42.37  γ  0.00

Displacement and tilt(4)
X  4.00  Y  0.00  Z  0.00
α  -20.10  β  18.97  γ  0.00

Displacement and tilt(5)
X  4.00  Y  0.00  Z  5.00
α  0.00  β  0.00  γ  0.00

Displacement and tilt(6)
X  4.00  Y  0.00  Z  5.00
α  0.00  β  0.00  γ  11.05

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) (RP1) | | | | |
| 2 | FFS① | | | 1.5254 | 55.8 |
| 3 | FFS② (RS) | | (1) | 1.5254 | 55.8 |
| 4 | FFS③ (RS) | | (2) | 1.5254 | 55.8 |
| 5 | FFS④ (RS) | | (3) | 1.5254 | 55.8 |
| 6 | FFS⑤ (RS) | | (4) | 1.5254 | 55.8 |
| 7 | FFS⑥ (RS) | | (5) | 1.5254 | 55.8 |
| 8 | FFS⑦ (RS) | | (6) | 1.5254 | 55.8 |
| 9 | ∞ | | (7) | | |
| 10 | ∞ (RP2) | 0.48 | (7) | | |
| 11 | ∞ | 0.55 | | 1.5230 | 55.0 |
| 12 | ∞ | 0.70 | | | |
| Image plane | ∞ | | | | |

FFS①
$C_4$  $7.2564 \times 10^{-2}$  $C_6$  $-2.9165 \times 10^{-2}$

FFS②
$C_4$  $-2.2246 \times 10^{-2}$  $C_5$  $-6.9778 \times 10^{-3}$  $C_6$  $-1.8133 \times 10^{-2}$
$C_7$  $-1.4510 \times 10^{-4}$  $C_8$  $-5.7940 \times 10^{-3}$  $C_9$  $-7.5289 \times 10^{-5}$
$C_{10}$  $1.3781 \times 10^{-3}$ FFS③
$C_4$  $3.2080 \times 10^{-2}$  $C_5$  $1.8755 \times 10^{-3}$  $C_6$  $2.6992 \times 10^{-2}$
$C_7$  $1.9288 \times 10^{-4}$  $C_8$  $1.7004 \times 10^{-3}$  $C_9$  $6.7255 \times 10^{-5}$
$C_{10}$  $-2.5866 \times 10^{-4}$ FFS④
$C_4$  $9.9382 \times 10^{-3}$  $C_5$  $1.8698 \times 10^{-2}$  $C_6$  $-4.7370 \times 10^{-3}$
$C_7$  $-2.6072 \times 10^{-4}$  $C_8$  $-1.2928 \times 10^{-3}$  $C_9$  $-5.2521 \times 10^{-5}$
$C_{10}$  $-2.0405 \times 10^{-3}$  $C_{12}$  $8.0073 \times 10^{-5}$ FFS⑤
$C_4$  $4.0039 \times 10^{-3}$  $C_5$  $1.2534 \times 10^{-2}$  $C_6$  $1.0658 \times 10^{-2}$
$C_7$  $8.2823 \times 10^{-5}$  $C_8$  $-6.6506 \times 10^{-4}$  $C_9$  $4.3071 \times 10^{-6}$
$C_{10}$  $4.2022 \times 10^{-3}$  $C_{12}$  $1.8872 \times 10^{-5}$ FFS⑥
$C_4$  $2.1596 \times 10^{-2}$  $C_5$  $6.0019 \times 10^{-3}$  $C_6$  $-1.7510 \times 10^{-2}$
$C_7$  $1.4740 \times 10^{-4}$  $C_8$  $-5.2513 \times 10^{-4}$  $C_9$  $7.9826 \times 10^{-5}$
$C_{10}$  $3.3808 \times 10^{-4}$ FFS⑦
$C_4$  $1.4717 \times 10^{-3}$  $C_5$  $-7.2278 \times 10^{-3}$  $C_6$  $4.3809 \times 10^{-3}$
$C_7$  $2.2783 \times 10^{-4}$  $C_8$  $2.1856 \times 10^{-3}$  $C_9$  $4.5633 \times 10^{-4}$
$C_{10}$  $-5.2986 \times 10^{-4}$ Displacement and tilt(1)
X  0.00  Y  0.00  Z  7.00
α  23.00  β  0.00  γ  0.00

Displacement and tilt(2)
X  0.00  Y  -7.25  Z  0.00
α  23.00  β  0.00  γ  0.00

Displacement and tilt(3)
X  0.00  Y  -7.25  Z  7.00
α  0.00  β  23.00  γ  0.00

Displacement and tilt(4)
X  6.61  Y  -7.25  Z  0.62
α  0.00  β  23.00  γ  0.00

Displacement and tilt(5)
X  6.61  Y  -7.25  Z  7.00
α  -23.07  β  0.00  γ  0.00

Displacement and tilt(6)
X  6.61  Y  0.00  Z  0.00
α  -23.07  β  0.00  γ  0.00

Displacement and tilt(7)
X  6.61  Y  0.00  Z  7.00
α  0.00  β  0.00  γ  0.00

Figure 5:
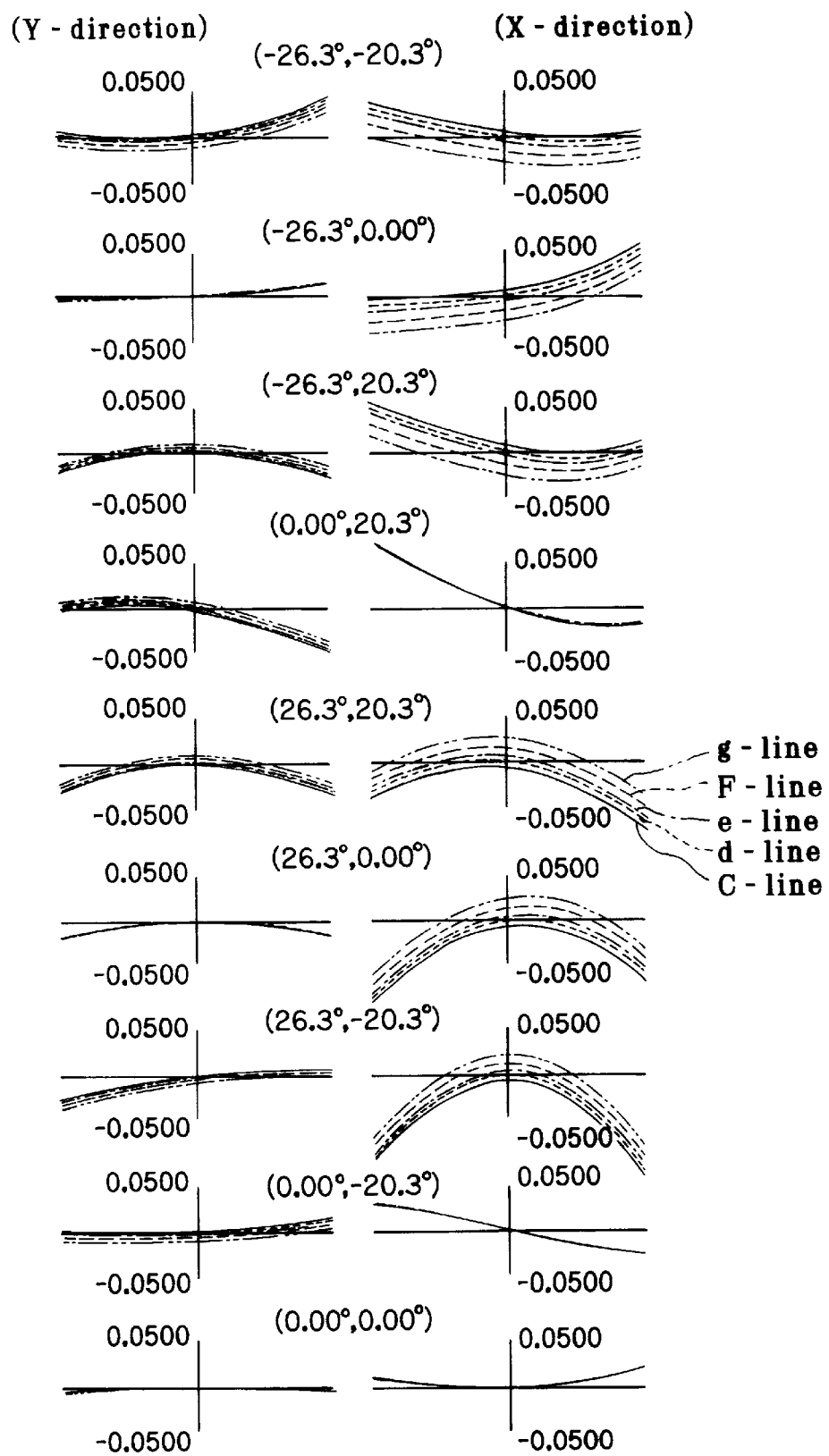
FIG. 5 is an aberrational diagram showing lateral aberrations in Example 1.
Figure 6:
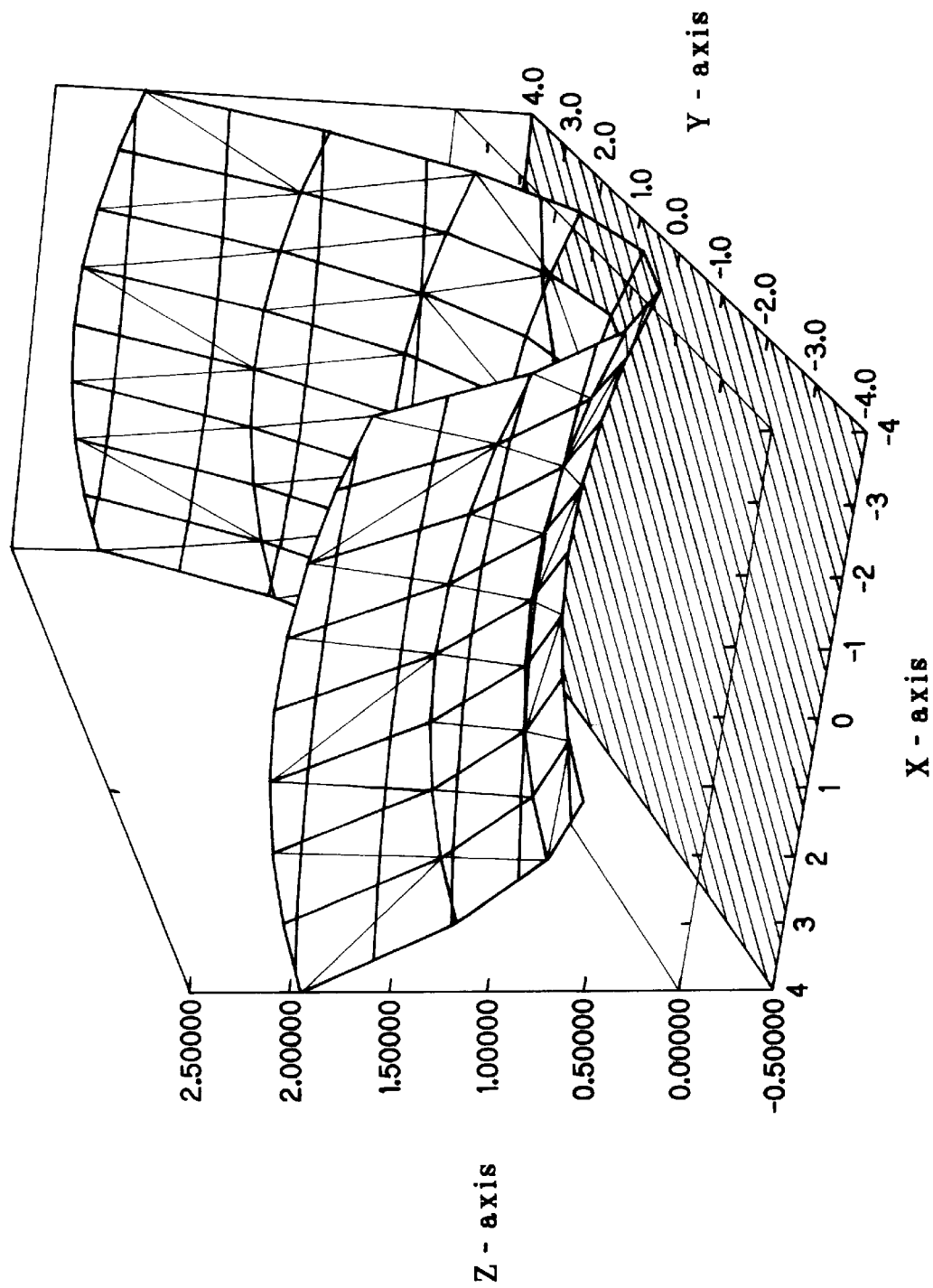
FIG. 6 is a bird's-eye view showing the surface configuration of a first surface in Example 3.
Figure 7:
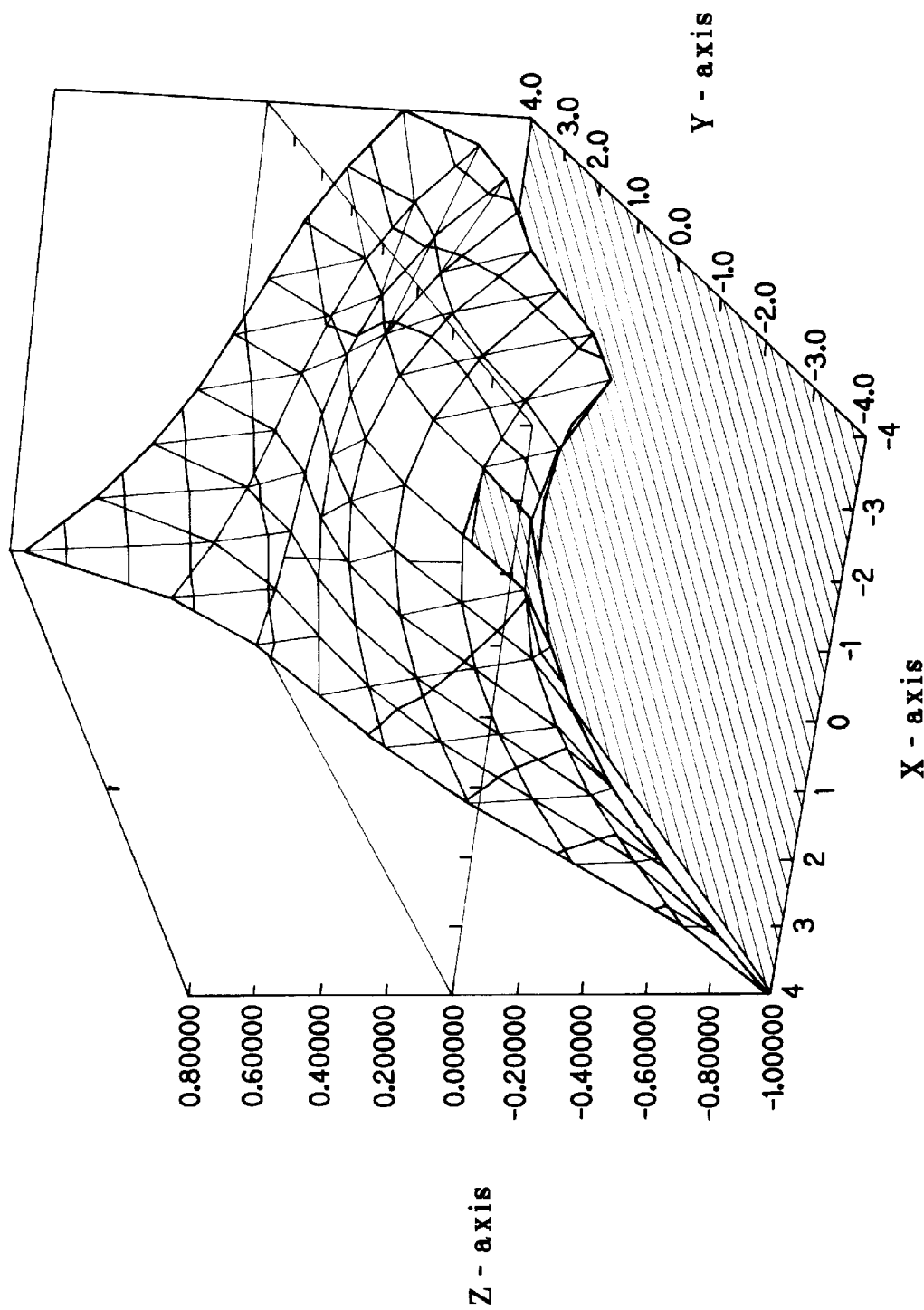
FIG. 7 is a bird's-eye view showing the surface configuration of a second surface in Example 3.
Figure 8:
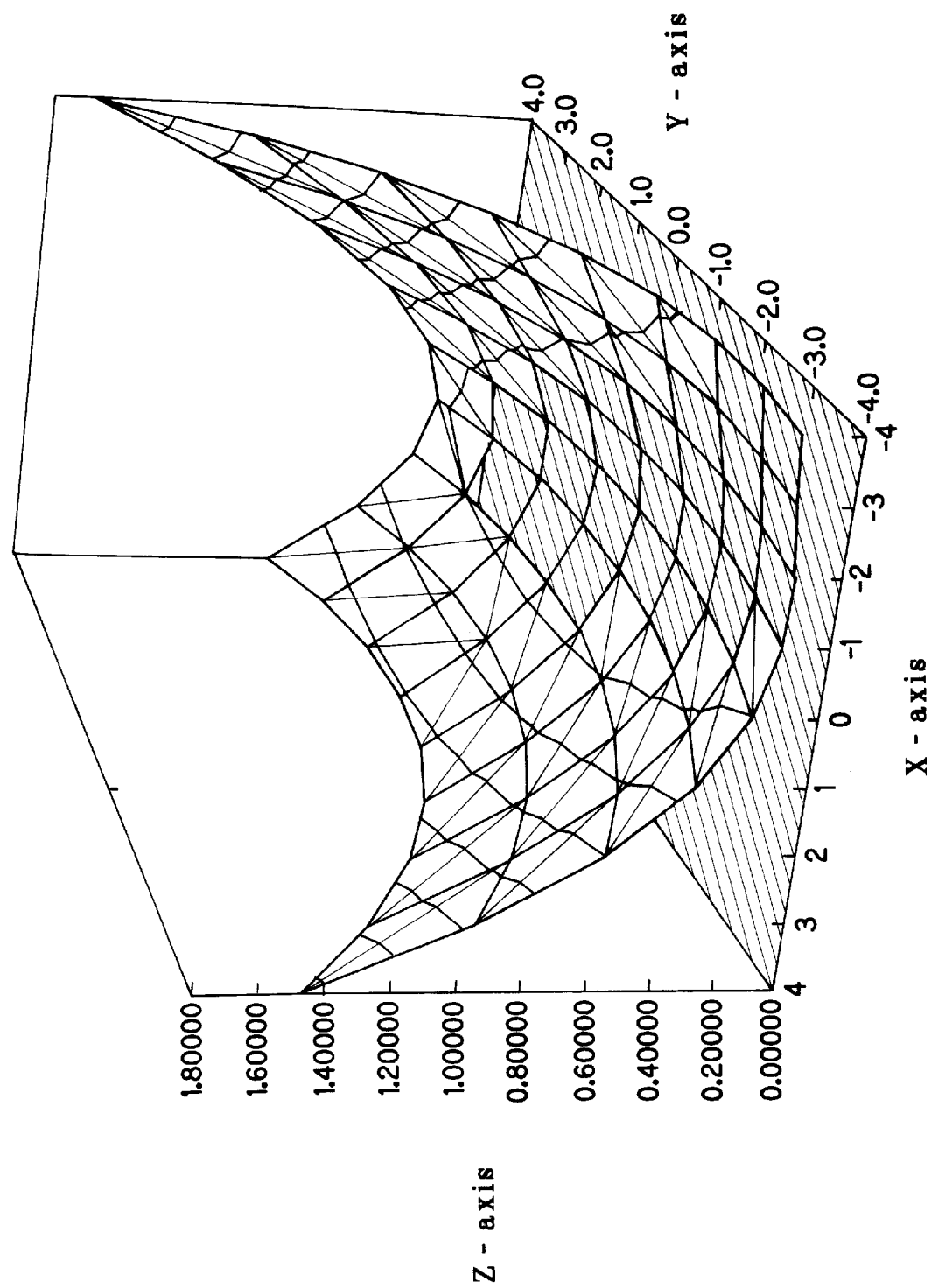
FIG. 8 is a bird's-eye view showing the surface configuration of a third surface in Example 3.
Figure 9:
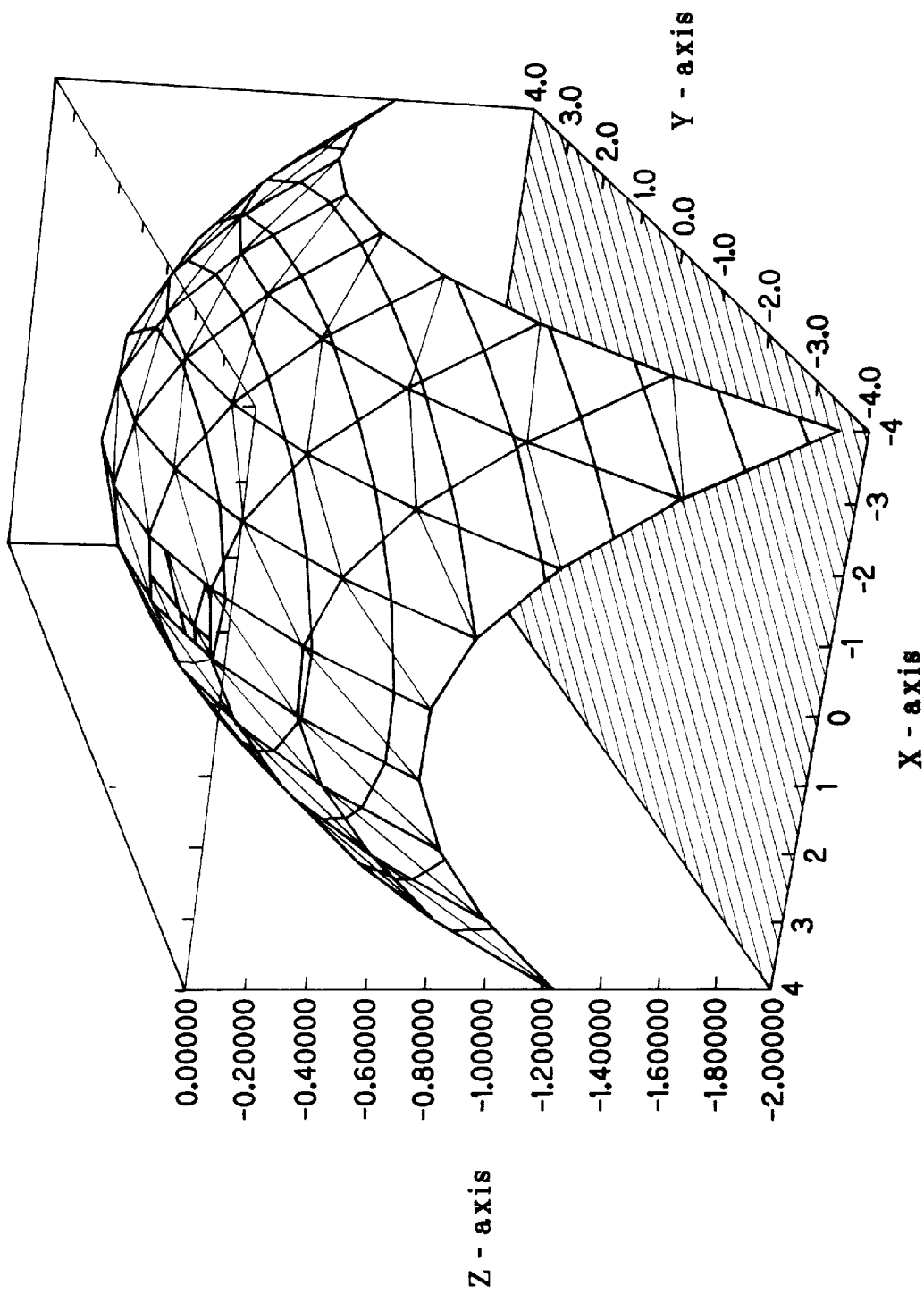
FIG. 9 is a bird's-eye view showing the surface configuration of a fourth surface in Example 3.
Figure 10:
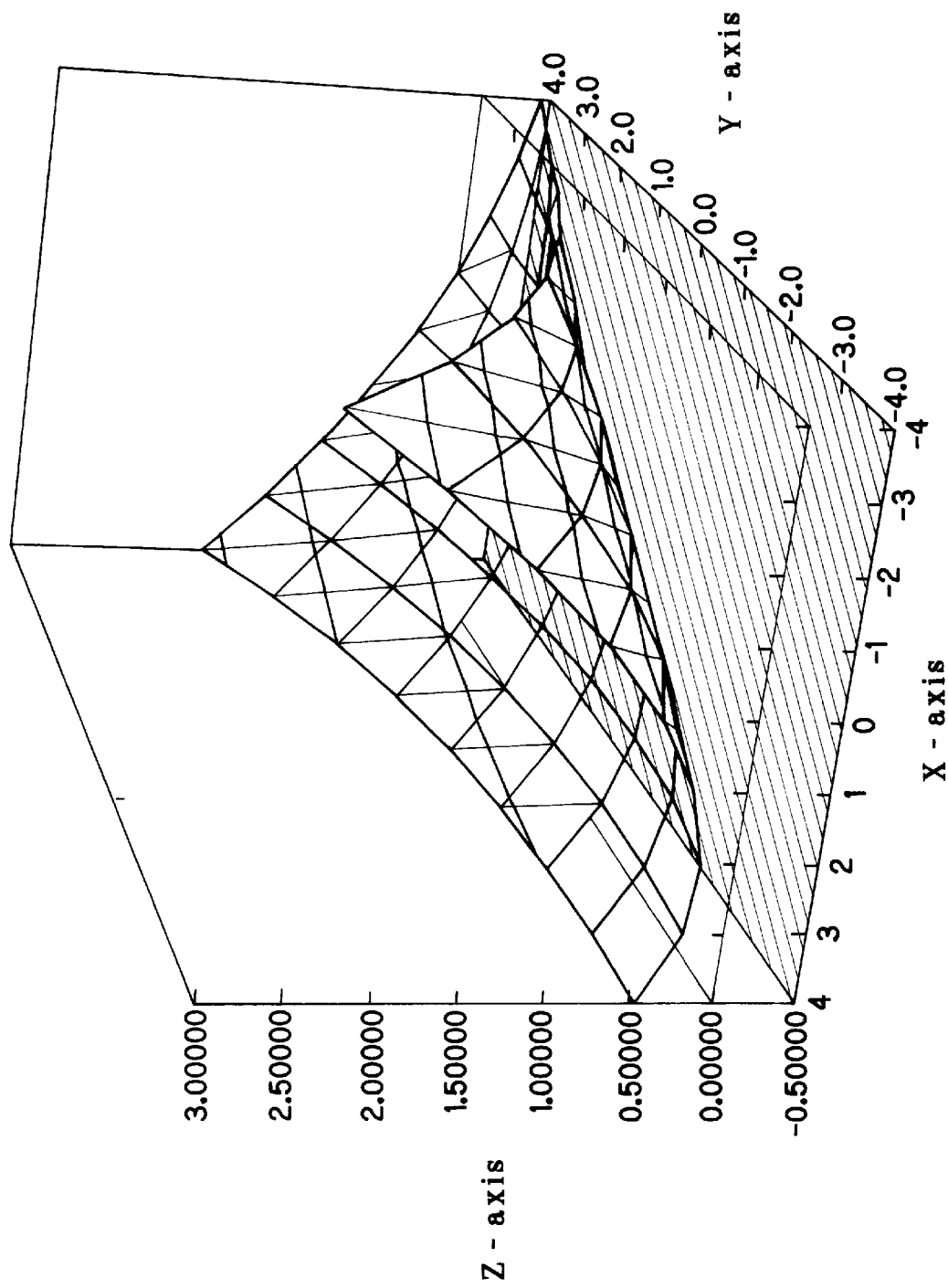
FIG. 10 is a bird's-eye view showing the surface configuration of a fifth surface in Example 3.
Figure 11:
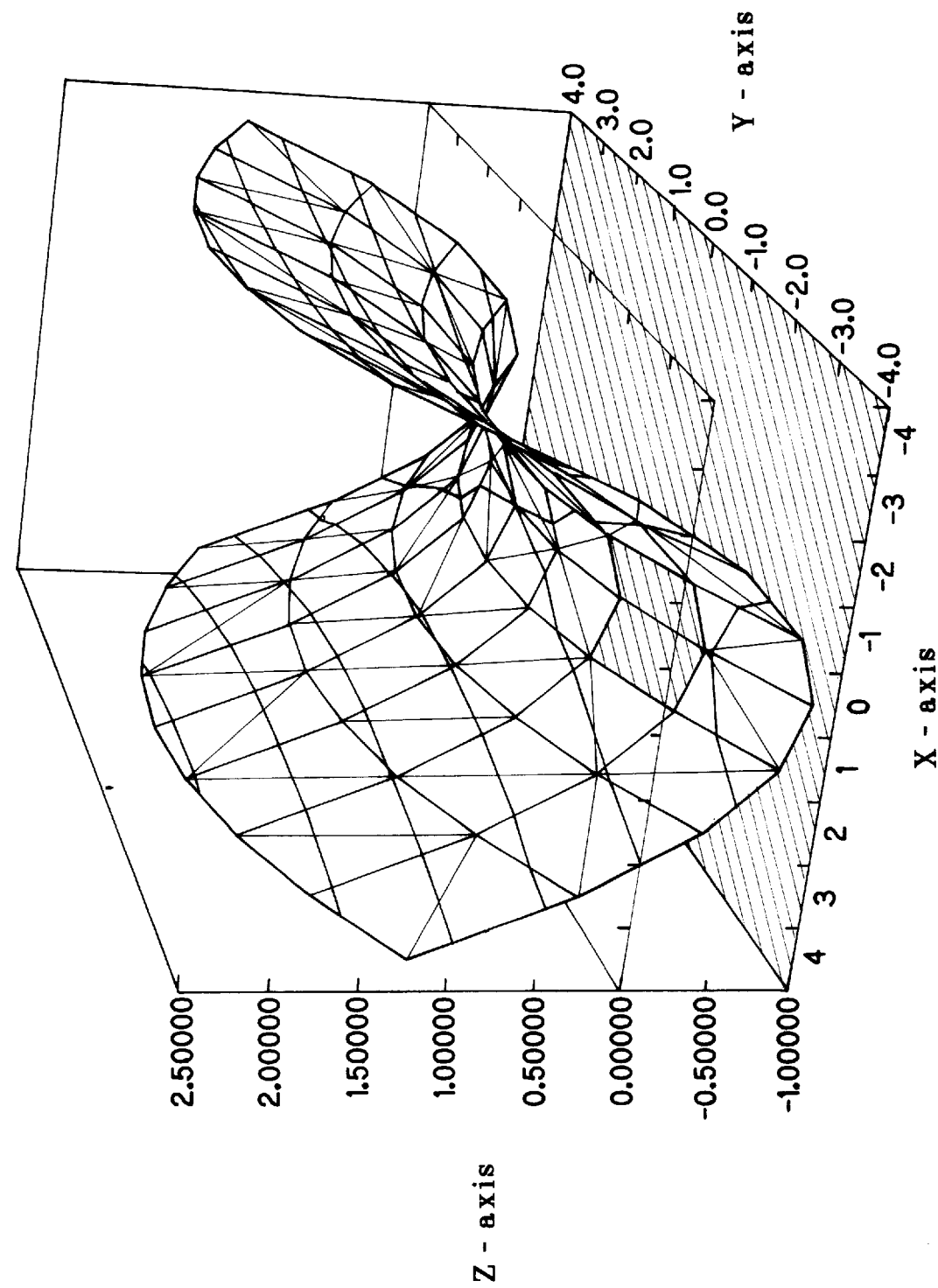
FIG. 11 is a bird's-eye view showing the surface configuration of a sixth surface in Example 3.

FIG. 5 is an aberrational diagram showing lateral aberrations in the above-described Example 1. In the aberrational diagram, the numerals in the parentheses denote [horizontal (X-direction) field angle, vertical (Y-direction) field angle], and lateral aberrations at the field angles are shown.

It should be noted that the surface configurations of the first to sixth surfaces 11 to 16 in the above-described Example 3 are shown in the bird's-eye views of FIGS. 6 to 11.

Figure 12:
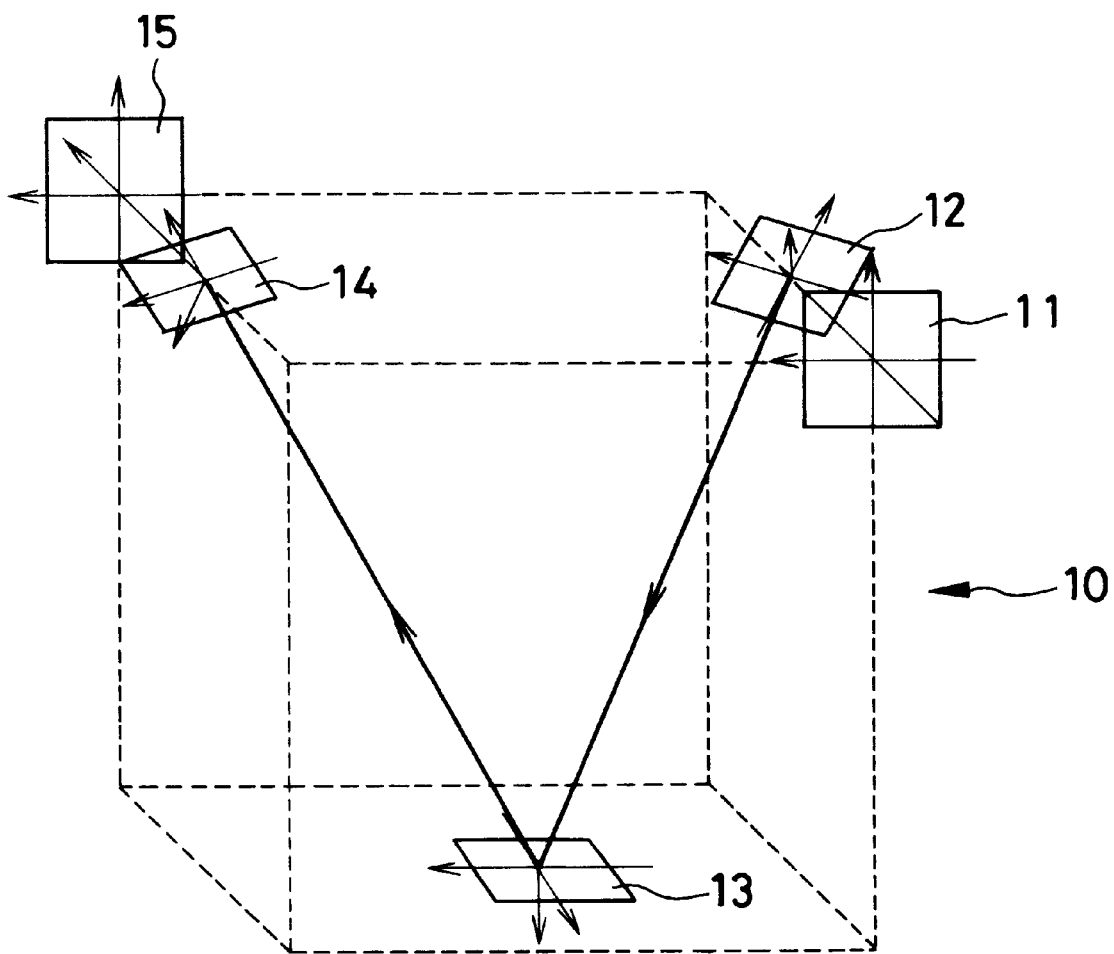
FIG. 12 is a diagram schematically showing the arrangement of each surface and an optical path in an example of a decentered optical system according to the present invention that uses three reflecting surfaces.

Although the foregoing examples use four or more reflecting surfaces, it is possible in the present invention to construct a decentered optical system by using three reflecting surfaces. An example thereof is shown in FIG. 12. The decentered prism optical system 10 shown in FIG. 12 comprises 5 curved surfaces 11 to 15. The first surface 11 is an entrance surface, which is a refracting surface through which rays enter the decentered prism. The second to fourth surfaces 12 to 14 are reflecting surfaces formed from back coating mirrors. The fifth surface 15 is an exit surface, which is a refracting surface through which rays exit from the decentered prism.

Rays from an object enter through the first surface 11 and are successively reflected by the second to fourth surfaces 12 to 14. The reflected rays exit from the fifth surface 15 and form an image on an image plane.

Regarding the travel direction of the optical axis, the optical axis entering through the first surface 11 and the optical axis exiting from the fifth surface 15 are parallel to each other and travel in the same direction. The optical axis is reflected successively by the second and third surfaces 12 and 13 and incident on the fourth surface 14 in one plane. The optical axis incident on the second surface 12 enters the plane from the obverse side thereof, and the optical axis reflected by the fourth surface 14 emerges from the reverse side of the plane.

Figure 13:
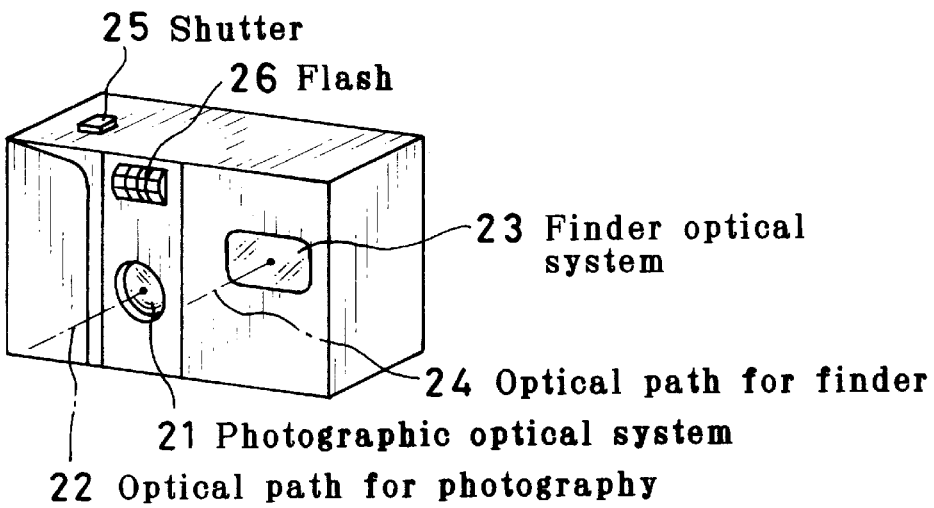
FIG. 13 is a diagram for describing an electronic camera to which the decentered optical system according to the present invention is applicable.
Figure 13:
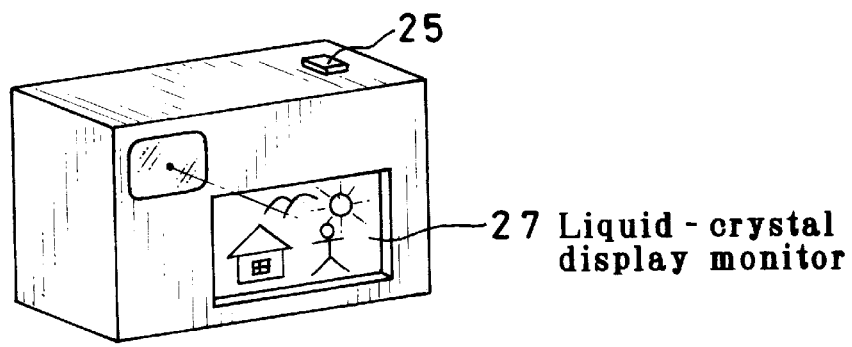
Figure 13:
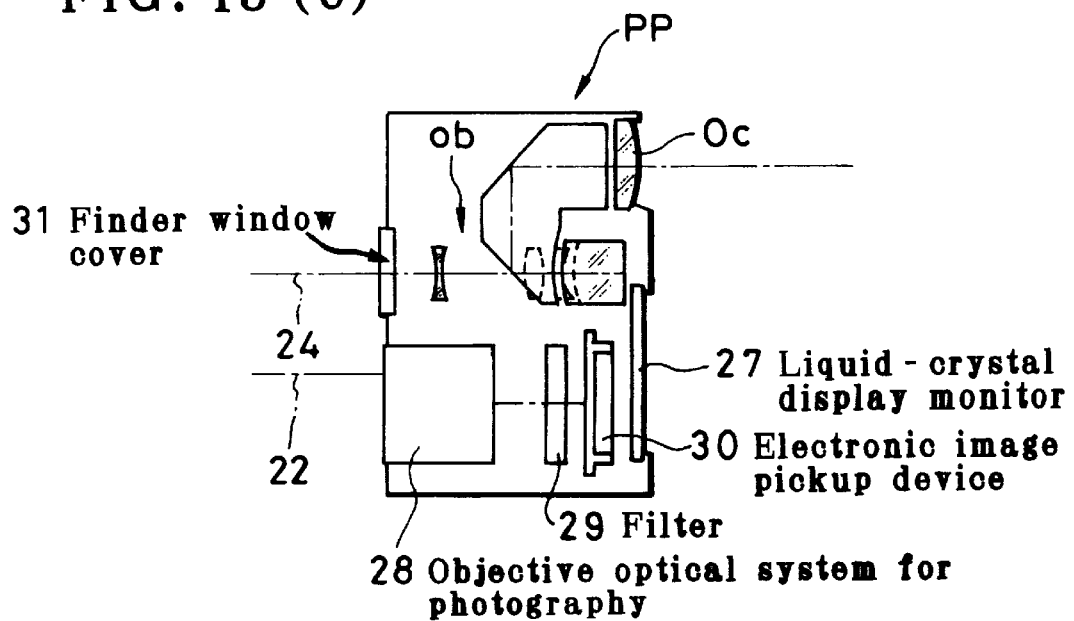

The above-described decentered optical system according to the present invention can be used in an objective optical system 28 for photography of an electronic camera as shown for example in FIG. 13. In FIG. 13: part (a) is a perspective view of the electronic camera as viewed from the front thereof; part (b) is a perspective view of the electronic camera as viewed from the rear thereof; and part (c) is a ray path diagram showing the optical system of the electronic camera. The electronic camera includes a photographic optical system 21 having an optical path 22 for photography, a finder optical system 23 having an optical path 24 for a finder, a shutter 25, a flash 26, a liquid-crystal display monitor 27, etc. The finder optical system 23 includes an objective optical system Ob, an image-inverting optical system PP, and an ocular optical system Oc, for example. The finder optical system 23 is of the type which enables the visual field to be viewed directly. It should be noted that a transparent finder window cover 31 is placed on the entrance side of the objective optical system Ob in the finder optical system 23.

The photographic optical system 21 includes an objective optical system 28 for photography formed from the decentered optical system according to the present invention, a filter 29, e.g. an infrared cutoff filter, and an electronic image pickup device 30 placed in the image-formation plane of the objective optical system 28. A subject image taken by the electronic image pickup device 30 or an image recorded in a recording device is displayed on the liquid-crystal display monitor 27.

As will be clear from the foregoing description, it is possible to obtain a fast and compact decentered optical system corrected for aberrations due to three-dimensional decentration by three-dimensionally disposing a rotationally asymmetric surface having no plane of symmetry.

What we claim is:

1. A decentered optical system comprising:
   an entrance surface through which a light beam enters;
   a first reflecting surface reflecting the light beam;
   a second reflecting surface reflecting the light beam;
   a third reflecting surface reflecting the light beam; and
   an exit surface from which the light beam exits;
   wherein at least one of said entrance surface, said first, second and third reflecting surfaces and said exit surface has a rotationally asymmetric surface configuration having no plane of symmetry and giving a positive power to the light beam; and
   wherein at least one of an intersection between said entrance surface and an optical axis, an intersection between said first reflecting surface and the optical axis, an intersection between said second reflecting surface and the optical axis, an intersection between said third reflecting surface and the optical axis, and an intersection between said exit surface and the optical axis is not in a plane where the other intersections are present.

2. A decentered optical system according to claim 1, wherein a space lying between said entrance surface, said three reflecting surfaces and said exit surface is filled with a medium having a refractive index larger than 1.

3. A decentered optical system according to claim 1, which has at least four reflecting surfaces.

4. A decentered optical system according to any one of claims 1 to 3, which has an entrance surface, four reflecting surfaces, and an exit surface,
   wherein when the reflecting surfaces are defined as a first reflecting surface, a second reflecting surface, a third reflecting surface, and a fourth reflecting surface in order in which reflection takes place, an optical axis is reflected successively by the first reflecting surface, the second reflecting surface and the third reflecting surface and incident on the fourth reflecting surface in one plane, and an optical axis incident on the first reflecting surface enters said plane from an obverse side thereof, and an optical axis reflected by the fourth reflecting surface emerges from a reverse side of said plane.

5. A decentered optical system according to any one of claims 1 to 3, which has an entrance surface, four reflecting surfaces, and an exit surface,
   wherein when the reflecting surfaces are defined as a first reflecting surface, a second reflecting surface, a third reflecting surface, and a fourth reflecting surface in order in which reflection takes place, an optical axis incident on the first reflecting surface enters a plane containing an optical axis incident on the second reflecting surface and the optical axis reflected by the second reflecting surface from an obverse side of said plane, and an optical axis reflected by the third reflecting surface and incident on the fourth reflecting surface emerges from the obverse side of said plane, and an optical axis reflected by the fourth reflecting surface travels toward the obverse side of said plane, and the optical axis from the second reflecting surface to the exit surface is present on one side of a plane containing the optical axis incident on the first reflecting surface and the optical axis reflected by the first reflecting surface.

6. A decentered optical system according to any one of claims 1 to 3, which has an entrance surface, four reflecting surfaces, and an exit surface,
   wherein when the reflecting surfaces are defined as a first reflecting surface, a second reflecting surface, a third reflecting surface, and a fourth reflecting surface in order in which reflection takes place, an optical axis incident on the first reflecting surface enters a plane containing an optical axis incident on the second reflecting surface and the optical axis reflected by the second reflecting surface from an obverse side of said plane, and an optical axis reflected by the third reflecting surface and incident on the fourth reflecting surface travels in said plane and intersects the optical axis incident on the second reflecting surface, and an optical axis reflected by the fourth reflecting surface emerges from a reverse side of said plane, and further an optical axis incident on the third reflecting surface lies on one side of a plane containing the optical axis incident on the first reflecting surface and the optical axis reflected by the first reflecting surface, and the optical axis reflected by the third reflecting surface intersects said plane to emerge from the other side thereof and is incident on the fourth reflecting surface.

7. A decentered optical system according to any one of claims 1 to 3, which has an entrance surface, six reflecting surfaces, and an exit surface, wherein when the reflecting surfaces are defined as a first reflecting surface, a second reflecting surface, a third reflecting surface, a fourth reflecting surface, a fifth reflecting surface, and a sixth reflecting surface in order in which reflection takes place, a plane surrounded by an optical axis incident on the second reflecting surface and the optical axis reflected by the second reflecting surface and a plane surrounded by an optical axis incident on the fifth reflecting surface and the optical axis reflected by the fifth reflecting surface do not intersect each other.

8. A decentered optical system according to claim 1 or 2, which has an entrance surface, three reflecting surfaces, and an exit surface, wherein when the reflecting surfaces are defined as a first reflecting surface, a second reflecting surface, and a third reflecting surface in order in which reflection takes place, an optical axis incident on the first reflecting surface enters a plane containing an optical axis incident on the second reflecting surface and the optical axis reflected by the second reflecting surface from an obverse side of said plane, and an optical axis reflected by the third reflecting surface and incident on the exit surface emerges from a reverse side of said plane.

9. A decentered optical system according to any one of claims 1 to 3, wherein an intermediate image is not formed in an optical path from the entrance surface to the exit surface.

10. A decentered optical system according to any one of claims 1 to 3, wherein an intermediate image is formed in an optical path from the entrance surface to the exit surface.

* * * * *